United States Patent
Wu

(10) Patent No.: US 8,549,757 B2
(45) Date of Patent: Oct. 8, 2013

(54) SCISSORS STRUCTURE WITH ADJUSTABLE OPENING

(75) Inventor: Shih-Piao Wu, Changhua (TW)

(73) Assignee: Jrin Haur Industrial Co. Ltd., Changhua (TW)

( * ) Notice: Subject to any disclaimer, the term of this patent is extended or adjusted under 35 U.S.C. 154(b) by 236 days.

(21) Appl. No.: 13/274,351

(22) Filed: Oct. 16, 2011

(65) Prior Publication Data
US 2013/0091713 A1  Apr. 18, 2013

(51) Int. Cl.
*B26B 13/00* (2006.01)

(52) U.S. Cl.
USPC .................... 30/254; 30/194; 30/244; 30/262

(58) Field of Classification Search
USPC ........... 30/254, 194, 233, 244, 245, 250–252, 30/261, 262, 186, 191–193
See application file for complete search history.

(56) References Cited

U.S. PATENT DOCUMENTS

| | | | | |
|---|---|---|---|---|
| 6,964,099 B1* | 11/2005 | Zeng | | 30/254 |
| 7,178,245 B1* | 2/2007 | Lee | | 30/254 |
| 7,536,791 B2* | 5/2009 | Toyama | | 30/254 |
| 8,458,912 B2* | 6/2013 | Linden et al. | | 30/131 |
| 2012/0198705 A1* | 8/2012 | Huang | | 30/244 |

* cited by examiner

*Primary Examiner* — Phong Nguyen
(74) *Attorney, Agent, or Firm* — Che-Yang Chen; Law Offize of Mizhael Chen

(57) ABSTRACT

A branch scissors structure with an adjustable structure includes a main body and an adjustable structure. One handle of the main body has a wedging opening at a front end near a blade, and a slot is recessedly formed at a bottom wall of the wedging opening. The adjustable structure located corresponding to the wedging opening has a connecting block, a restricting block, a pressing unit and a restricting unit. The position of the restricting block can be adjusted, so that the restricting block can protrude and lean against the outer periphery of the blade through the opening of the connecting block and forms a secure positioning when the restricting unit engages with the restricting slot. The blade can be restricted by the restricting block, and the angle between the handle and blade cab be further limited.

5 Claims, 13 Drawing Sheets

SCISSORS STRUCTURE WITH ADJUSTABLE OPENING

FIELD OF THE INVENTION

The present invention relates to a structure of scissors, and more particularly refers to a structure of branch scissors with an adjustable blade opening.

BACKGROUND OF THE INVENTION

Conventionally, tree branch scissors have two handles, and front end of each handle has a blade. The blades are cross and pivotally connected with each other, so that when a user holds the handles to generate a relative movement therebetween to further produce a shear force to cut flowers, grass and plants. Currently, a spring is disposed between two handles to release the resilient force after cutting. Furthermore, the user does not have to pull the handles apart to ease the uncomfortable feeling on the hands. However, conventional branch scissors only have a fixed open angle for the user to hold and cut, so it cannot be operated according to the object's status and the size of the user's hands. Also, it is disadvantageous that the user has to exert forces on the conventional scissors, which causes the user to feel uncomfortable and not able to effectively apply forces, and the user may feel sore and hurt easily while operating the conventional scissors.

SUMMARY OF THE INVENTION

The technical problem the present invention wants to solve is that conventional branch scissors only have a fixed open angle for the user to hold and cut, so it cannot be operated according to the object's status and the size of the user's hands. Also, it is disadvantageous that the user has to exert forces on the conventional scissors, which causes the user to feel uncomfortable and not able to effectively apply forces, and the user may feel sore and hurt easily while operating the conventional scissors.

The technical point to solve the problem above is that the present invention provides a branch scissor structure with an adjustable opening including a main body and an adjustable structure, and one handle of the main body has a wedging opening at a front end near a blade, and a slot is recessedly formed at a bottom wall of the wedging opening. The adjustable structure has a connecting block, a restricting block, a pressing unit and a restricting unit. The connecting block has a sliding slot on one lateral surface and connected through one end to form an opening, and the other lateral surface has a plurality of restricting slots corresponding to the sliding slot, and the restricting slot and the sliding slot are connected with each other. The restricting block is located in the sliding slot of the connecting block, and the restricting block has a non-circular opening for a resilient unit covering a through portion of the pressing unit to plug in. One side of the through portion forms a head end, so that the resilient unit is restricted between the restricting block and the head end. The other side of the through portion has a through connecting hole, and the restricting slot of the connecting block provides the restricting unit to connect with the connecting hole of the through portion, so that the restricting unit is restricted in one of the restricting slots of the connecting block and the sliding block is pressed by the resilient unit and restricted in the sliding slot. Finally, the adjustable structure with every component is disposed in the wedging opening of the main body to form a branch scissors structure with an adjustable opening.

Comparing with prior arts, the main body has a corresponding adjustable structure, and the position of the restricting block can be adjusted, so that the restricting block can protrude and lean against the outer periphery of the blade through the opening of the connecting block and forms a secure positioning when the restricting unit engages with the restricting slot. The blade can thus be restricted by the restricting block and the angle between the handle and blade can be further limited. Since the structure in the present invention can be used according to the size of the user's hands and the objects, the user feels more comfortable when using it and the practicability of the present invention is enhanced.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
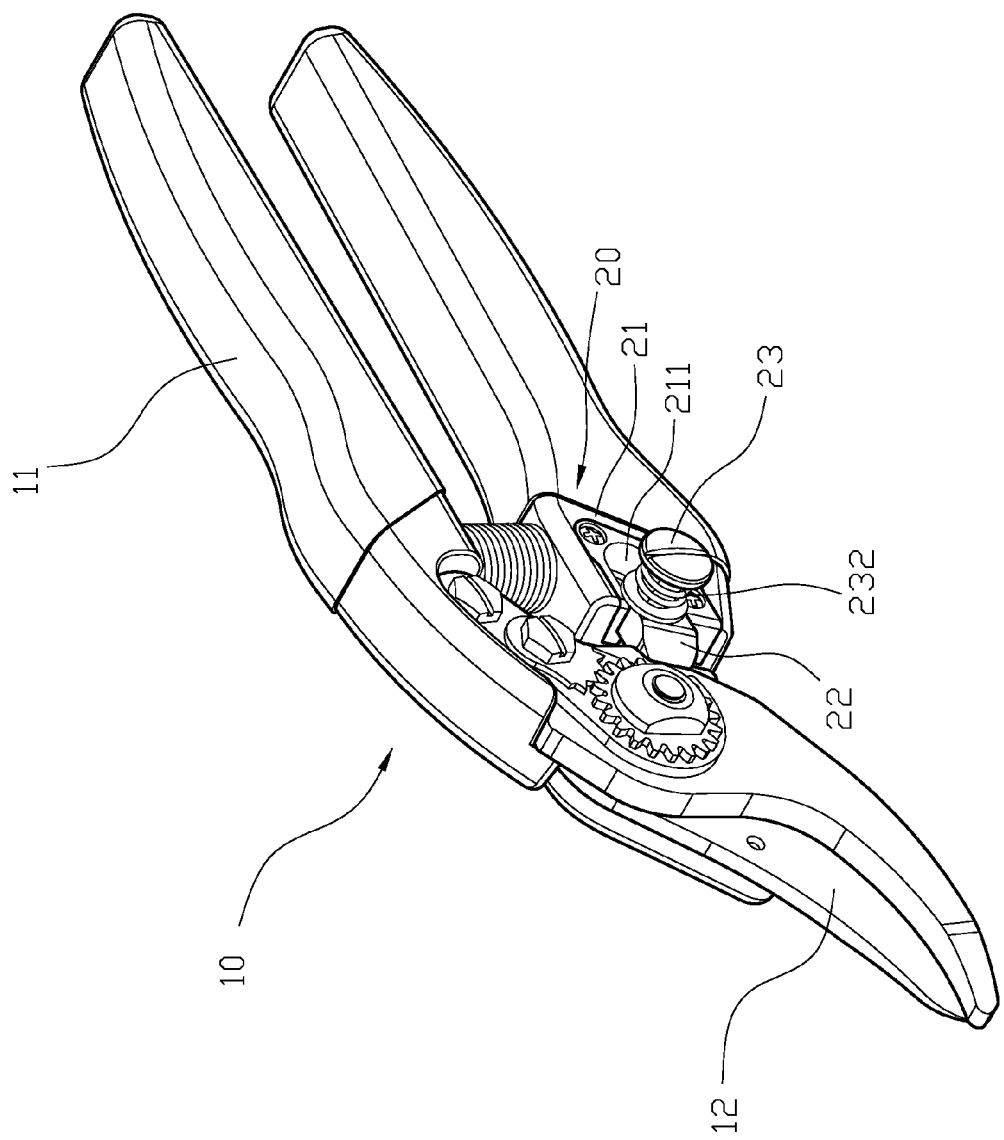
FIG. 1 illustrates a three-dimensional assembled view in the present invention.
Figure 2:
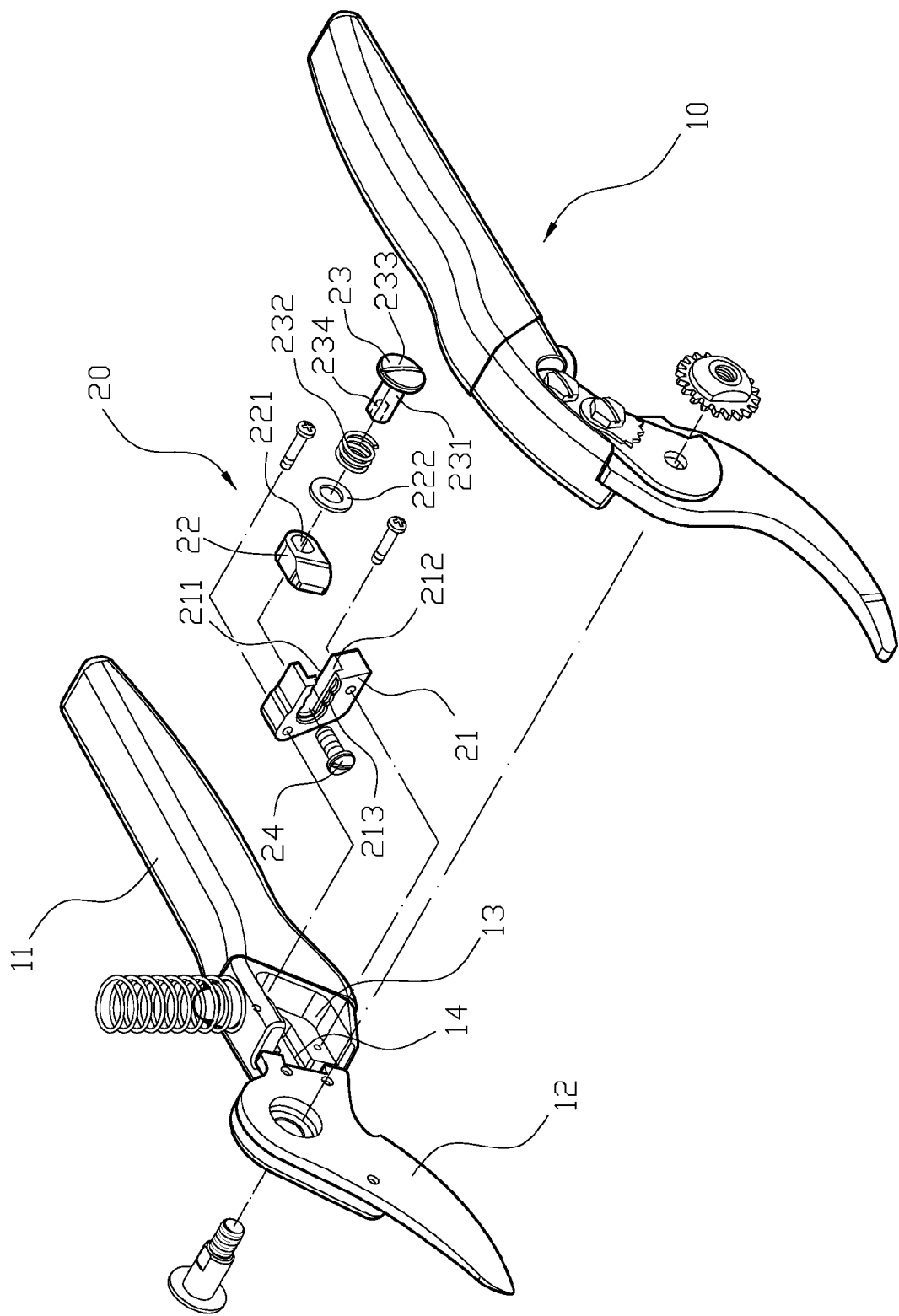
FIG. 2 illustrates an exploded view of one embodiment in the present invention.
Figure 3:
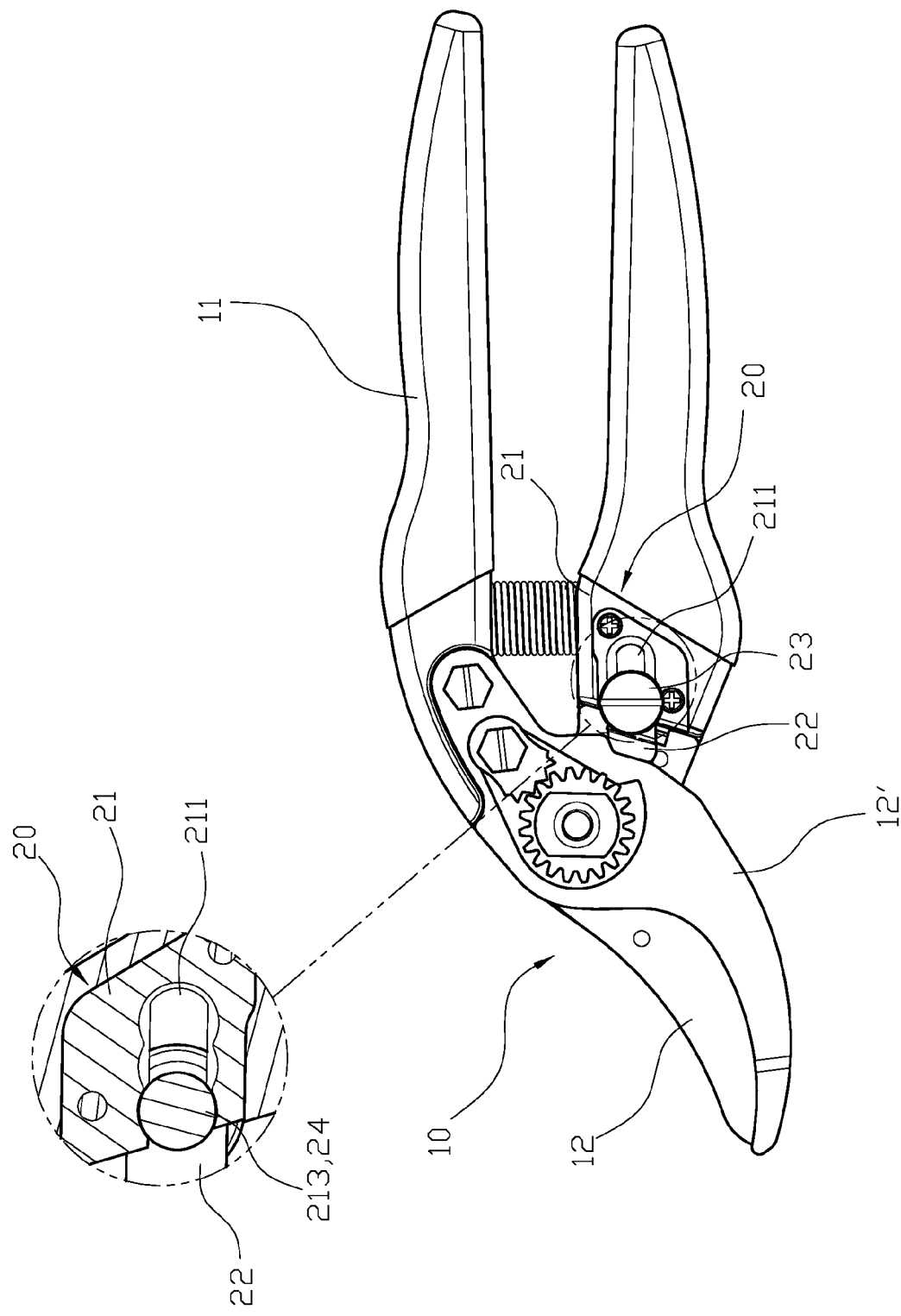
FIG. 3 illustrates a sectional view of a restored status in the present invention.
Figure 4:
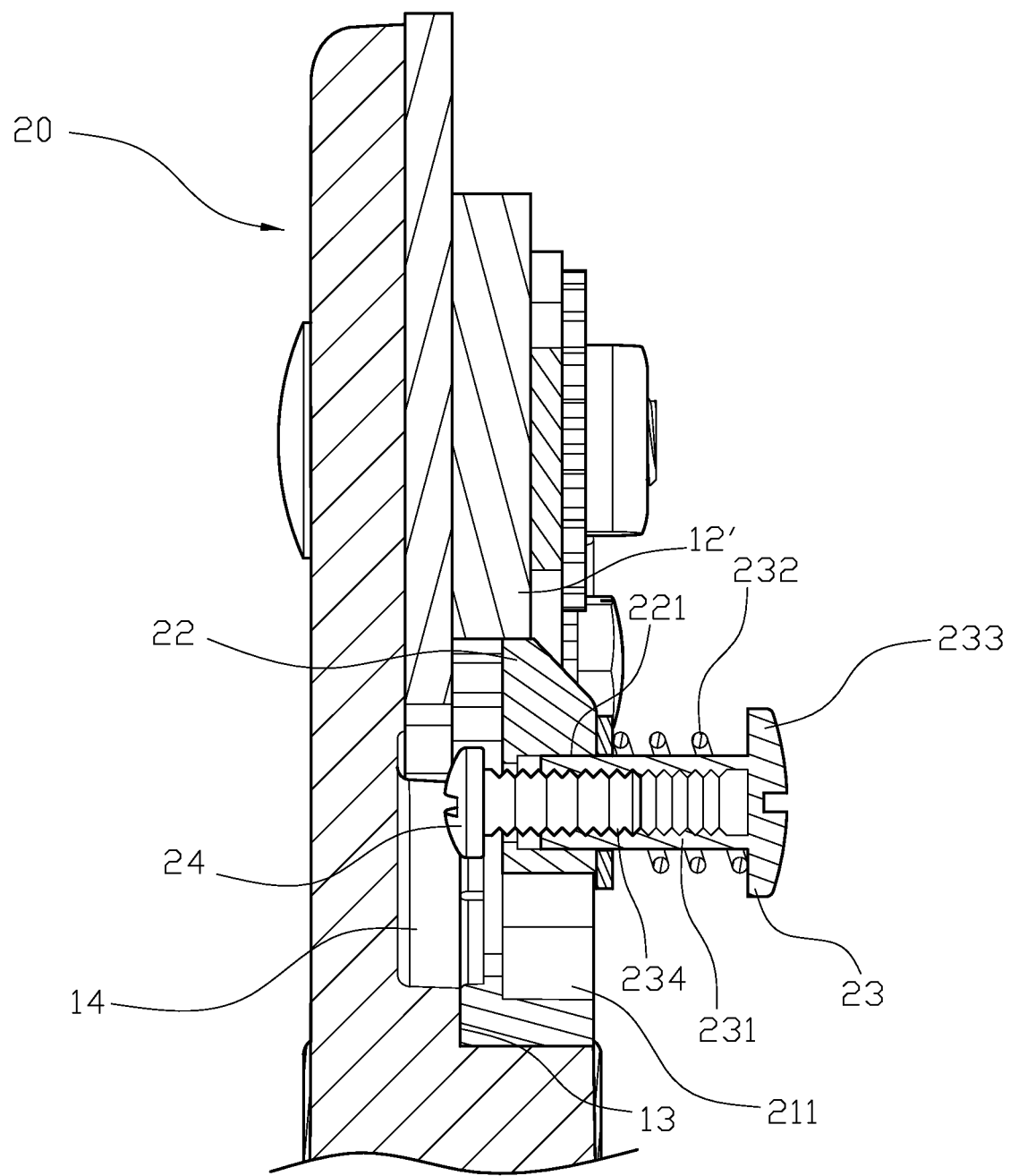
FIG. 4 illustrates a second sectional view of a restored status in the present invention.
Figure 5:
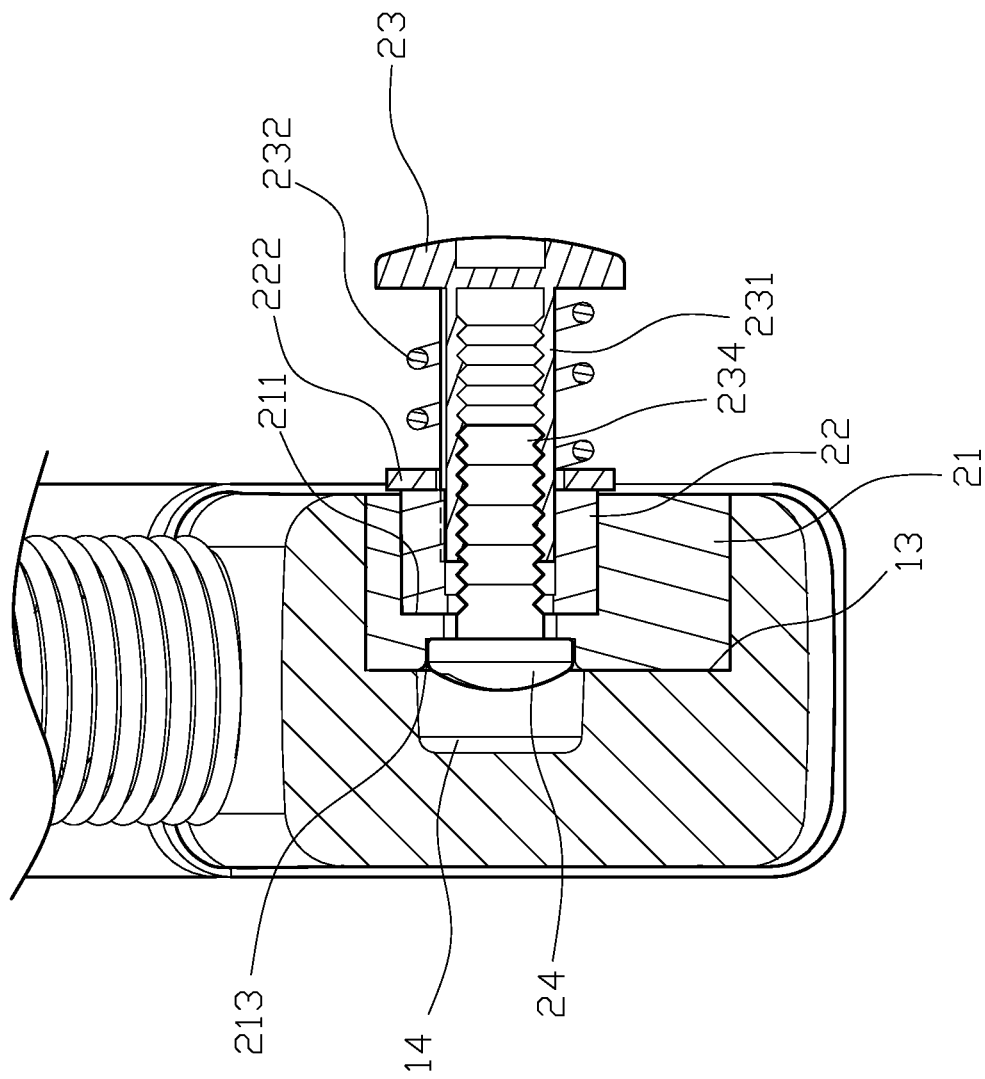
FIG. 5 illustrates a sectional view of the restricting unit engaging with the restricting slot in the present invention.

In order to further understand the goal, characteristics and effect of the present invention, a number of embodiments along with the drawings are illustrated as following:

Referring to FIGS. 1 and 2, a branch scissors structure with an adjustable opening includes a main body (10) and an adjustable structure (20), and one handle (11) of the main body (10) has a wedging opening (13) at a front end near a blade (12), and a slot (14) is recessedly formed at a bottom wall of the wedging opening (13). The adjustable structure (20) has a connecting block (21), a restricting block (22), a pressing unit (23) and a restricting unit (24). The connecting block (21) has a sliding slot (211) on one lateral surface and connected through one end to form an opening (212), and the other lateral surface has a plurality of restricting slots (213) corresponding to the sliding slot (211), and the restricting slot (213) and the sliding slot (211) are connected with each other. The restricting block (22) is located in the sliding slot (221) of the connecting block (21), and the restricting block (22) has a non-circular opening (221) for a resilient unit (232) covering a through portion (231) of the pressing unit (23) to plug in. The non-circular opening (221) of the restricting block (22) provides a pad (222) for the resilient unit (232) to lean against, and one side of the through portion (231) forms a head end (233), so that the resilient unit (232) is restricted between the restricting block (22) and the head end (233). The other side of the through portion (231) has a through connecting hole (234), and the restricting slot (213) of the connecting block (21) provides the restricting unit (24) to connect with the connecting hole (234) of the through portion (231), so that the restricting unit (24) is restricted in one of the restricting slots (213) of the connecting block (21) and the sliding block (22) is pressed by the resilient unit (232) and restricted in the sliding slot (211). A pressing space is formed at a bottom end of the through portion (231) of the pressing unit (23) and the non-circular opening (221) of the restricting block (22), and the adjustable structure (20) is disposed in the wedging opening (13) of the main body (10) through the restricting unit (24) as a bottom portion, and a terminal of the bottom portion of the restricting unit (24) is disposed in the slot (14) of the wedging opening (13) to form a branch scissors structure with an adjustable opening.

Referring to FIGS. 1, 3 and 4-6, when the main body (10) is restored and not being used, the restricting block (22) of the adjustable structure (20) passes through the opening (212) of the connecting block (21) and is against an edge of the other blade (12') through a front portion thereof. The restricting unit (24) at the bottom portion of the adjustable structure (20) is restricted in the restricting slot (213), so that the restricting block (22) is restricted to avoid sliding in the sliding slot (211) of the connecting block (21). In other words, it can effectively lean against the edge of the edge of the blade (12') to prevent the handle (11) from escaping due to the resilient unit.

Figure 6:
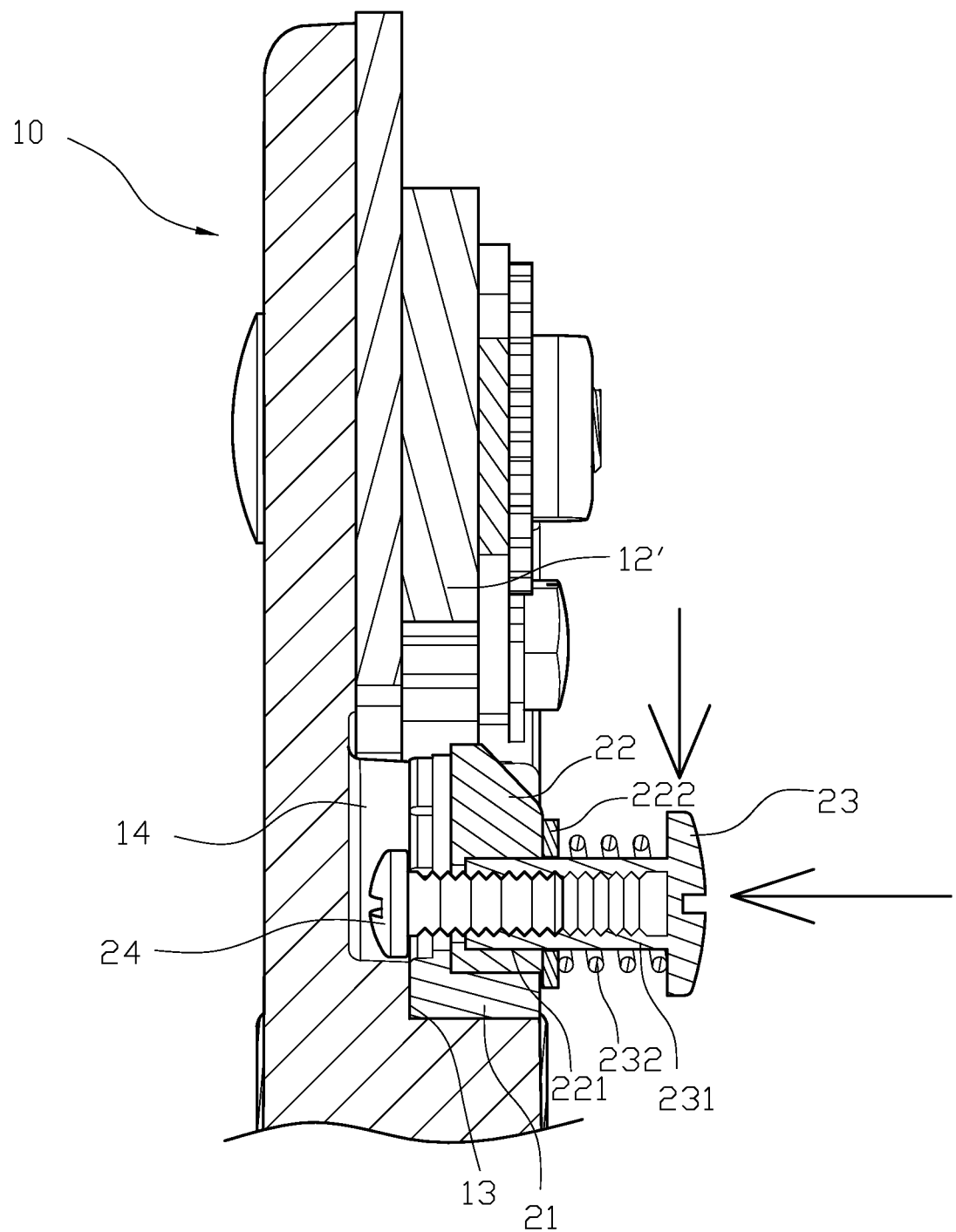
FIG. 6 illustrates a schematic view of pressing and movement in the present invention.
Figure 7:
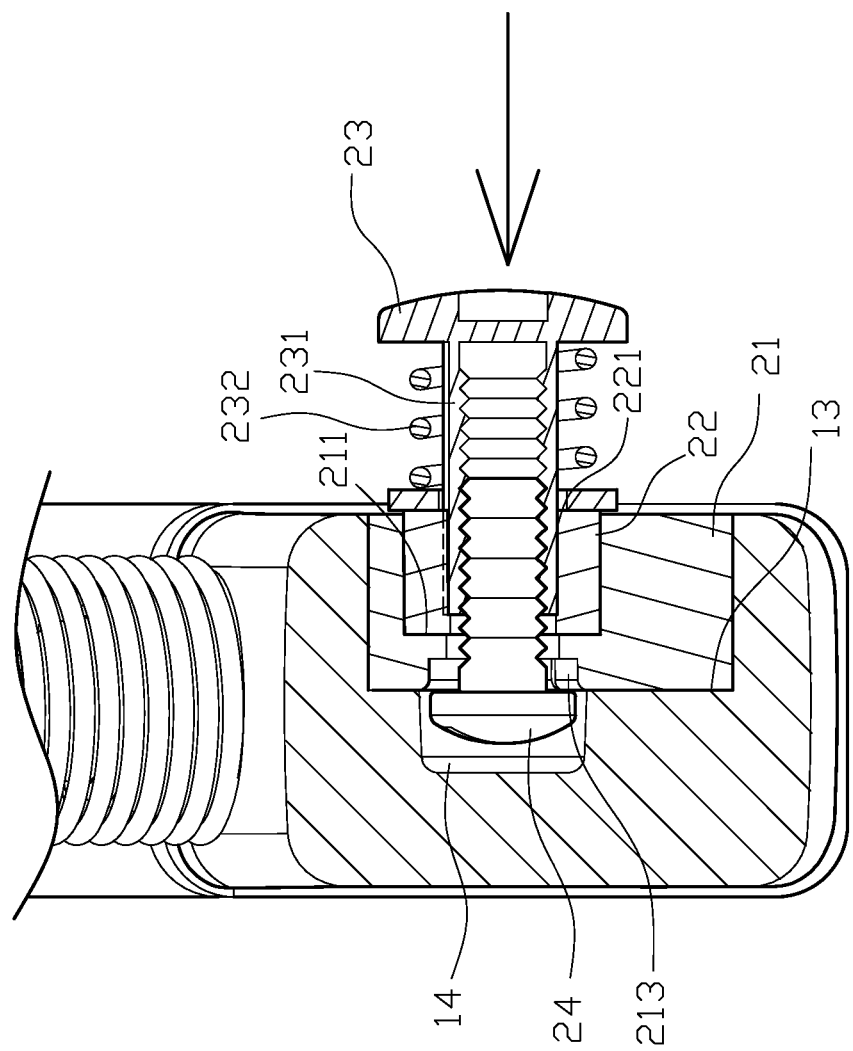
FIG. 7 illustrates a sectional view of the restricting unit escaping the restricting slot in the present invention.
Figure 8:
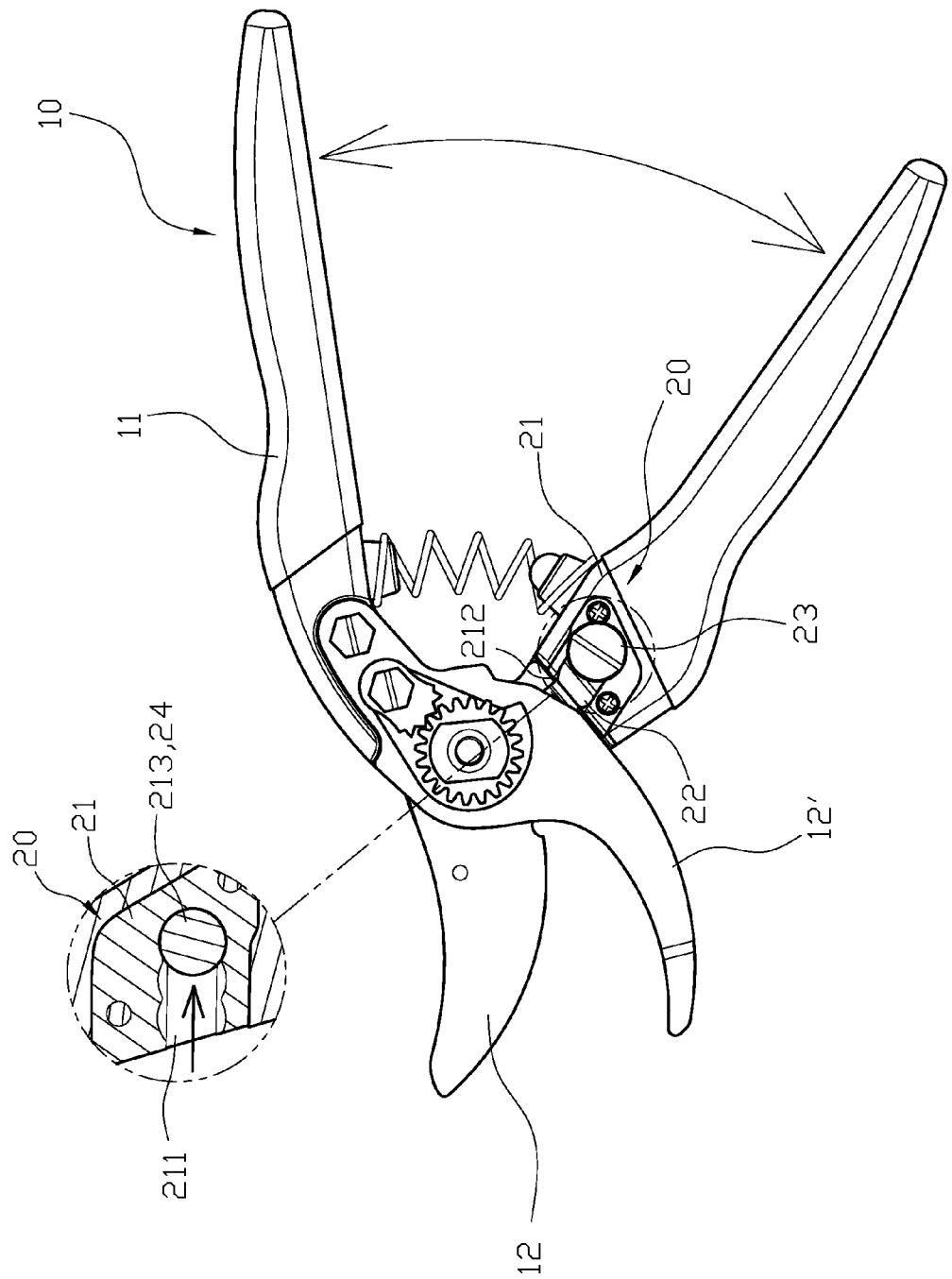
FIG. 8 illustrates a schematic view of blade and handle in use in the present invention.

Referring to FIGS. 6-8, when the main body (10) is used for cutting, the pressing unit (23) of the adjustable structure (20) is pressed, the restricting unit (24) that is connected with the pressing unit (23) escapes from the restricting slot (213). The restricting block (22) is then pushed to move inside toward the sliding slot (211), and escapes from the edge of the blade (12') in a predetermined distance. Also, when releasing the pressing unit (23), the resilient unit (232) causes the restricting unit (24) to bounce back to the restricting slot (213) to restrict the restricting block (22). At this time, the blade (12) of the main body (10) can be expanded from the resilient unit between two handles (12) to form an opening. In other words, the user can use it to cut by pressing the handle (11).

Figure 9:
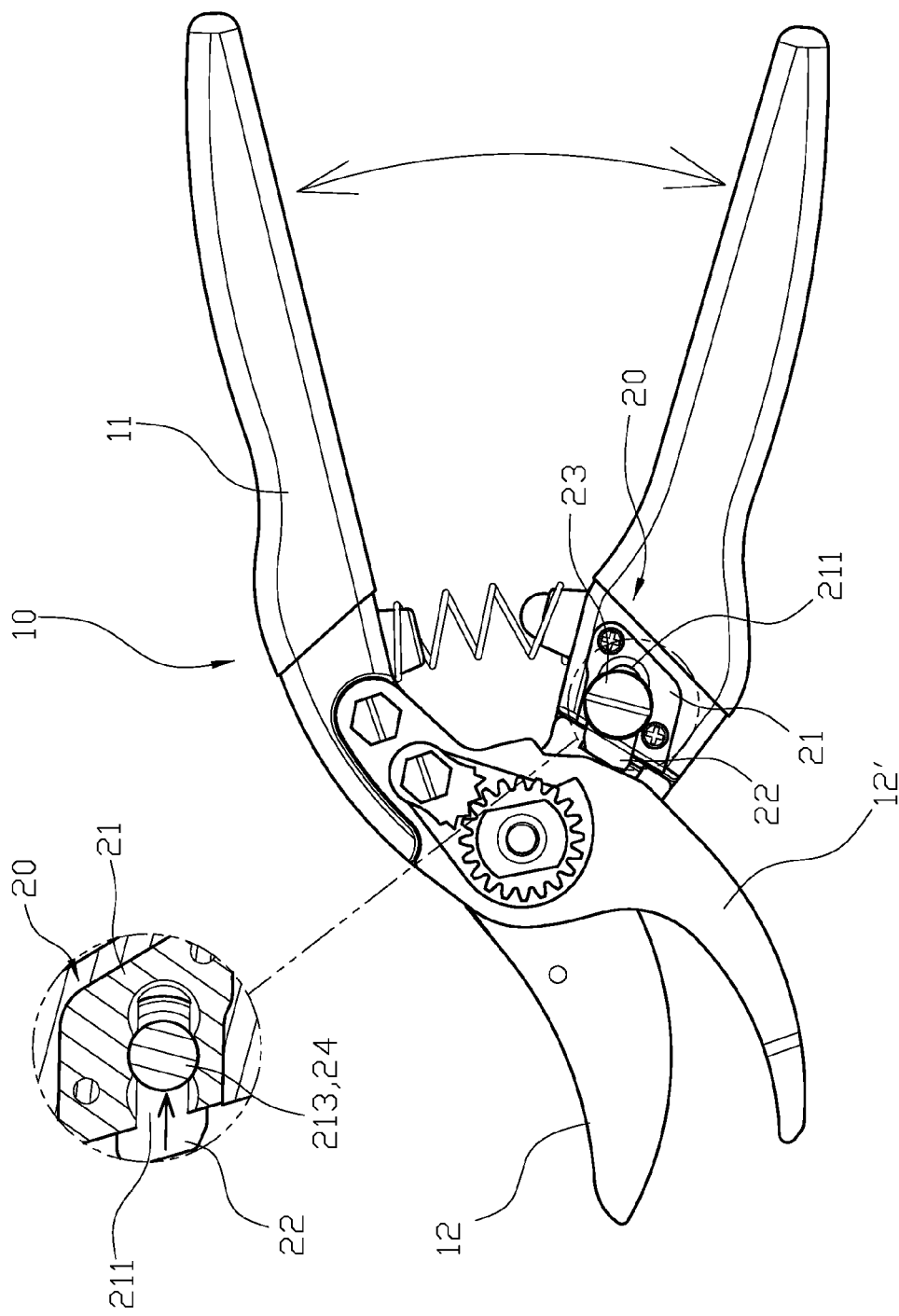
FIG. 9 illustrates a schematic view in the present invention after adjustment.
Figure 10:
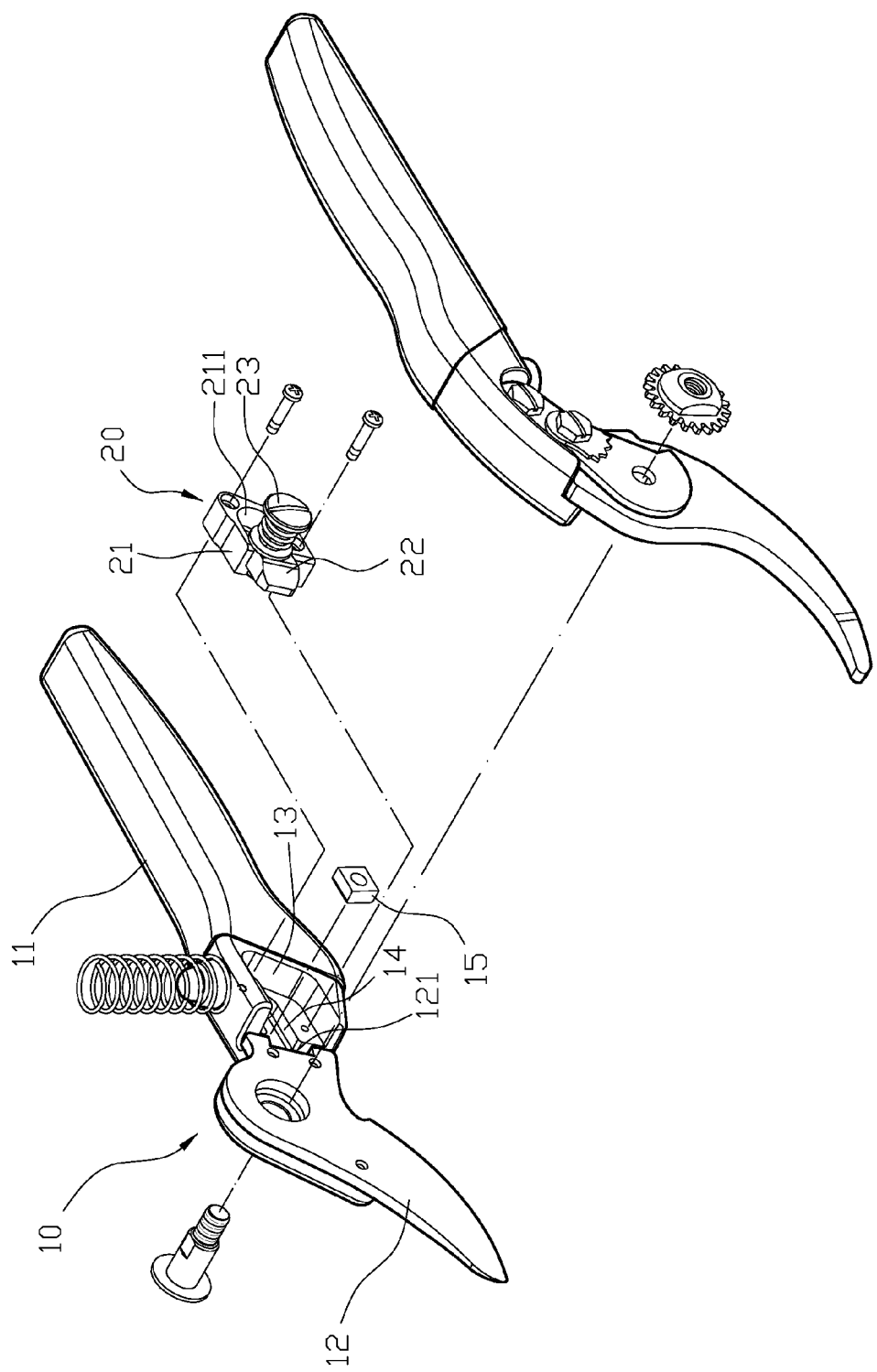
FIG. 10 illustrates a preferred embodiment in the present invention.
Figure 11:
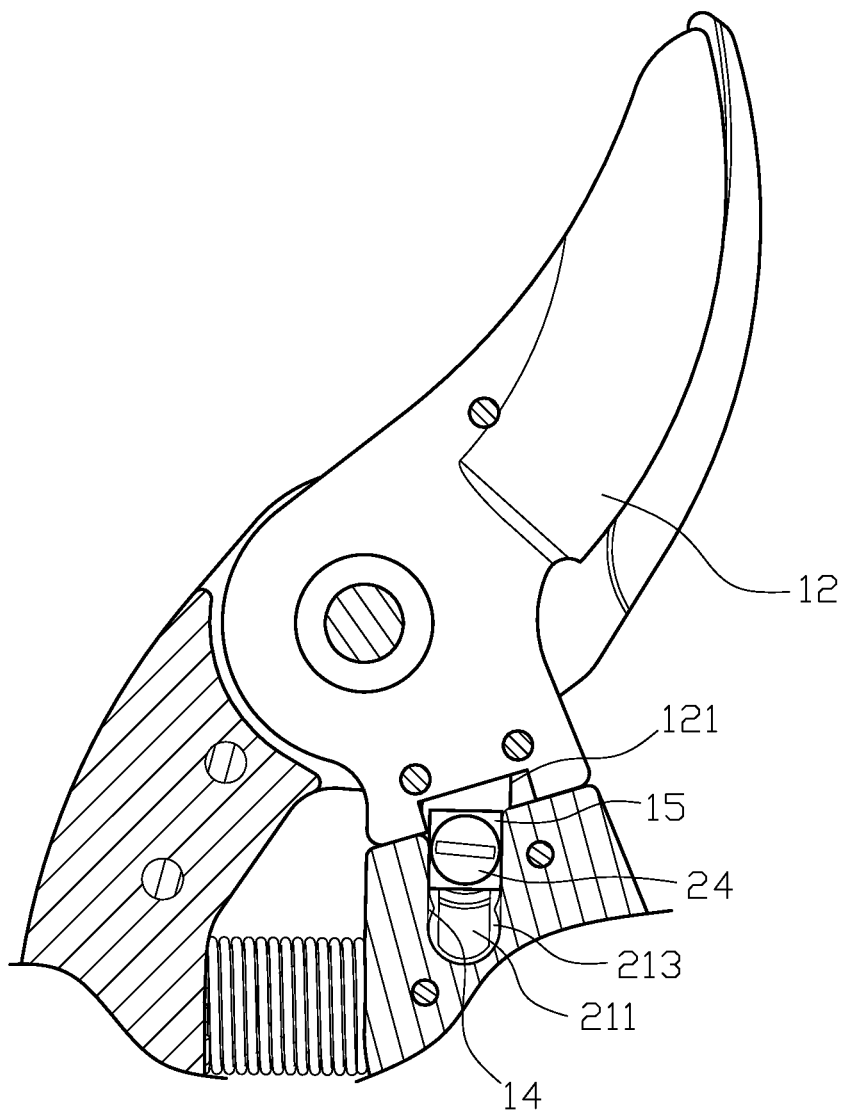
FIG. 11 illustrates a sectional view of the preferred embodiment in the present invention.
Figure 12:
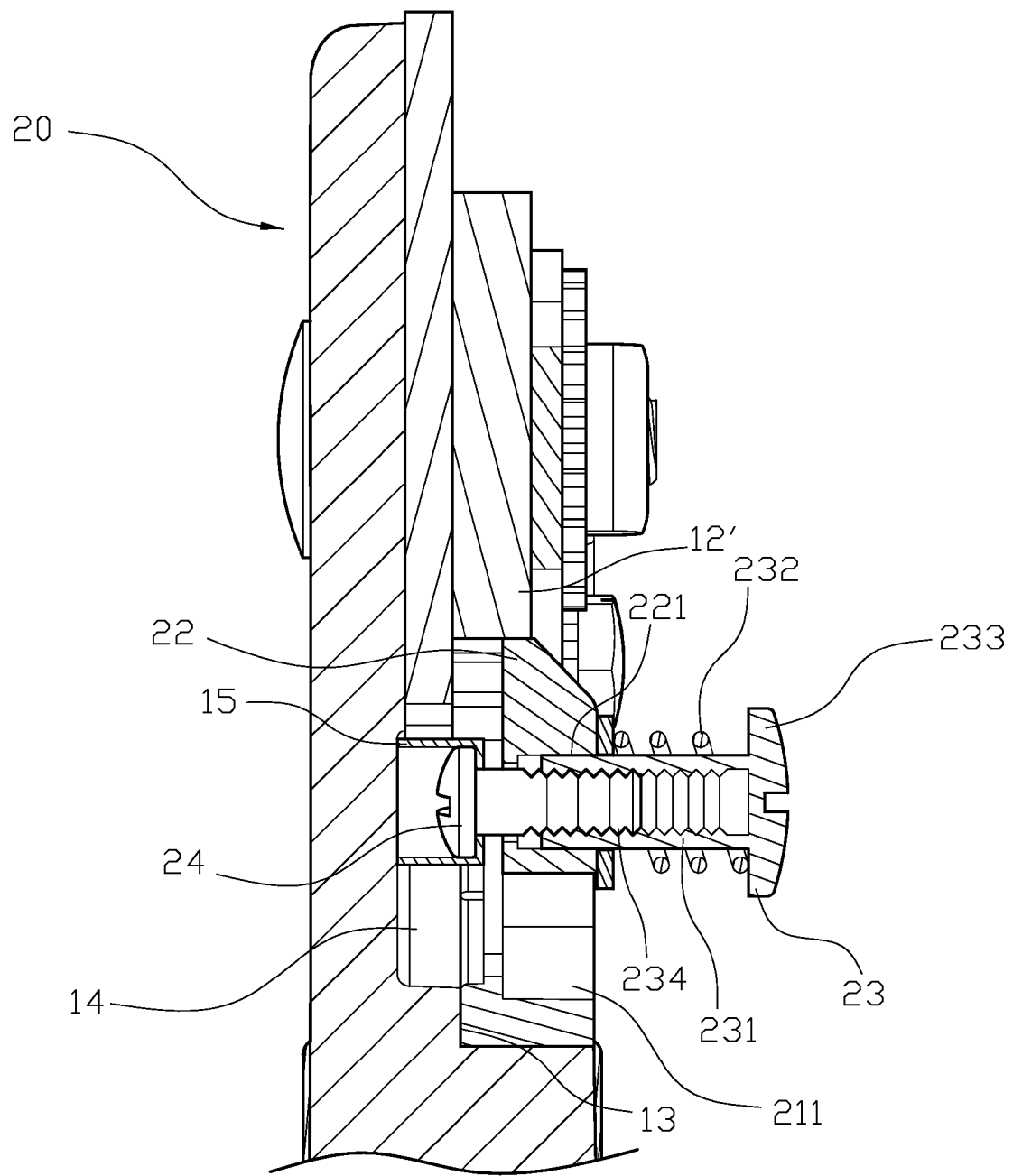
FIG. 12 illustrates a sectional view of the preferred embodiment (not in motion) in the present invention.
Figure 13:
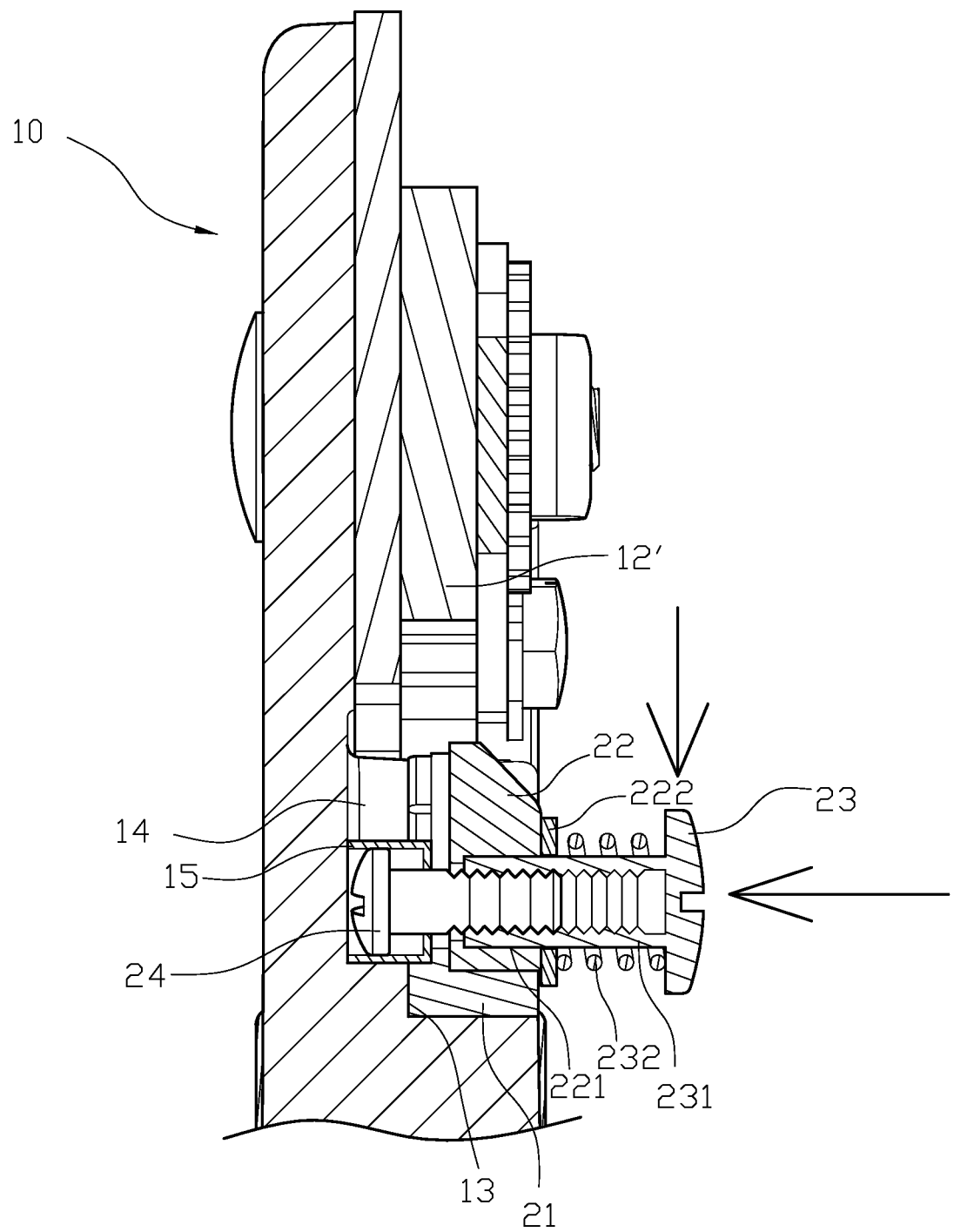
FIG. 13 illustrates a sectional view of the preferred embodiment (in motion) in the present invention.

Moreover, a plurality of restricting slots (213) are formed at the bottom of the connecting block (21) of the adjustable structure (20) and the sliding slot (211), and the restricting block (22) forms a secure position through the restricting unit (24) at the bottom and corresponding restricting slot (213), so that the restricting block (22) has a plurality sections for adjustment. Referring to FIGS. 8 and 9, the length protruding of the opening (212) of the restricting block (22) can be restricted by the restricting unit (24) in the restricting slot (213), and the length represents the distance between the sliding block (22) and the edge of the blade (12'). Thus, the opening angle between the blade (12) and the handle (11) of the main body (10) can be adjusted and restricted, and the main body can be used according to the size of the user's hands and the size of the object.

A preferred embodiment is shown in FIGS. 10 to 13. The restricting unit (24) has a sliding pad (15) located in the slot (14) of the wedging opening (13), and the blade (12) coupled with the handle (11) has an evading slot (121) near the wedging opening (13) corresponding to the sliding pad (15). When the restricting block (22) moves after the pressing unit (23) is pressed, the bottom of the adjustable structure (20) drives the sliding pad to slide in the slot (14) to form another status of restrictive sliding, which prevents the pressing unit (23) from being against the wall of the slot (14) after being pressed and ensures that the pressing unit (23) is effectively pressed. Also, with the sliding movement of the sliding block (22) in the sliding slot (211), the restricting unit (24) can restrictively slide in the slot (14) through the sliding pad (15) to enhance the stability and precision of the movement.

According to the structure in the abovementioned embodiments, the present invention is advantageous that the main body (10) has a corresponding adjustable structure (20), and the position of the restricting block (22) can be adjusted, so that the restricting block (22) can protrude and lean against the outer periphery of the blade (12) through the opening (212) of the connecting block (21) and forms a secure positioning when the restricting unit (24) engages with the restricting slot (213). The blade (12) can thus be restricted by the restricting block (22), and the angle between the handle (11) and blade (12) can be further limited. Since the structure in the present invention can be used according to the size of the user's hands and the objects, the user feels more comfortable when using it and the practicability of the present invention is enhanced.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A branch scissor structure with an adjustable opening comprising:

a main body, one handle of the main body having a wedge-shaped opening at a front end near a blade, and a slot recessedly formed at a bottom wall of the wedge-shaped opening; and an adjustable structure having a connecting block, a restricting block, a pressing unit and a restricting unit, wherein the connecting block has a sliding slot on one lateral surface and connected through one end of the connecting block to form an opening, and the other lateral surface has a plurality of restricting slots corresponding to the sliding slot, and the restricting slots and the sliding slot are connected with each other, wherein the restricting block is located in the sliding slot of the connecting block, and the restricting block has a non-circular opening for receiving a through-portion of the pressing unit, wherein one side of the through-portion forms a head end so that the resilient unit is restricted between the restricting block and the head end, and the other side of the through-portion has a through-connecting hole, wherein the restricting unit extends through one of restricting slots and engages with the through-connecting hole of the through-portion of the resilient pressing unit so that the restricting unit is restricted in one of the restricting slots of the connecting block, and wherein the restricting block is pressed by the resilient unit and restricted in the sliding slot.

2. The branch scissor structure with an adjustable opening of claim 1, wherein the non-circular opening of the restricting block provides a pad for the resilient unit to dispose against.

3. The branch scissor structure with an adjustable opening of claim 1, wherein when the connecting block of the adjustable structure is disposed in the wedge-shaped opening of the handle.

4. The branch scissor structure with an adjustable opening of claim 3, wherein the restricting unit has a sliding pad disposed in the slot of the wedging opening.

5. The branch scissor structure with an adjustable opening of claim 4, wherein an evading slot is formed near the wedging opening corresponding to the sliding pad.

* * * * *